(12) United States Patent
Dubrule et al.

(10) Patent No.: US 12,226,967 B2
(45) Date of Patent: Feb. 18, 2025

(54) MULTIFUNCTIONAL FILM

(71) Applicant: SAINT-GOBAIN PERFORMANCE PLASTICS CORPORATION, Solon, OH (US)

(72) Inventors: Steven R. Dubrule, Holden, MA (US); Jennifer Adamchuk, Marlborough, MA (US); Nicole Love, Somerville, MA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 683 days.

(21) Appl. No.: 17/348,055

(22) Filed: Jun. 15, 2021

(65) Prior Publication Data

US 2021/0394465 A1   Dec. 23, 2021

Related U.S. Application Data

(60) Provisional application No. 63/040,947, filed on Jun. 18, 2020.

(51) Int. Cl.
*B29C 70/54* (2006.01)
*C08L 101/00* (2006.01)
*C09D 5/00* (2006.01)

(52) U.S. Cl.
CPC .......... *B29C 70/544* (2021.05); *C08L 101/00* (2013.01); *C09D 5/00* (2013.01); *C08L 2201/14* (2013.01); *C08L 2203/16* (2013.01)

(58) Field of Classification Search
None
See application file for complete search history.

(56) References Cited

U.S. PATENT DOCUMENTS 5,129,813 A    7/1992  Shepherd
5,316,462 A    5/1994  Seemann
(Continued)

FOREIGN PATENT DOCUMENTS

CA         921670 A        2/1973
CN     104112693 A   *  10/2014  ....... H01L 21/67126
(Continued)

OTHER PUBLICATIONS

MX Nylon Properties published online at https://www.fostercomp.com/wp-content/uploads/2018/11/MX-Nylon_properties.pdf by Mitsubishi Gas Chemical Co. (Year: 2018).*

(Continued)

*Primary Examiner* — Michael C Miggins
(74) *Attorney, Agent, or Firm* — Abel Schillinger, LLP; Chi Suk Kim (57) ABSTRACT

The present disclosure relates to a multifunctional film for a vacuum bag that may include a flexible barrier film that may include a textured surface. The multifunctional film may further include a release coating overlying the textured surface of the flexible barrier film. The multifunctional film may further have an oxygen ($O_2$) permeability of not greater than about 1100 cc/(m2-day-atm) and a stability rating of not greater than about 90%, where the stability rating is defined as the maximum percent decrease in elongation at break as measured using ASTM D882 after being exposed to a temperature of 200° C. for 12 hours.

17 Claims, 3 Drawing Sheets

(56) References Cited

U.S. PATENT DOCUMENTS

| | | |
|---|---|---|
| 5,439,635 A | 8/1995 | Seemann |
| 5,601,852 A | 2/1997 | Seemann |
| 5,702,663 A | 12/1997 | Seemann |
| 5,807,593 A | 9/1998 | Thompson |
| 5,837,185 A | 11/1998 | Livesay et al. |
| 7,413,694 B2 | 8/2008 | Waldrop et al. |
| 7,534,039 B2 | 5/2009 | Wu |
| 8,105,068 B2 | 1/2012 | Ross et al. |
| 8,672,665 B2 | 3/2014 | Rydin et al. |
| 2003/0100685 A1 | 5/2003 | Farkas |
| 2006/0035046 A1* | 2/2006 | Lee ................ B29C 59/046 |
| | | 264/171.23 |
| 2008/0182054 A1 | 7/2008 | Ridges et al. |
| 2014/0191434 A1 | 7/2014 | Rydin et al. |
| 2016/0082710 A1 | 3/2016 | Coxon et al. |
| 2016/0368177 A1* | 12/2016 | Kasai ................ B32B 27/322 |
| 2016/0368229 A1 | 12/2016 | Fernandes et al. |

FOREIGN PATENT DOCUMENTS

| | | |
|---|---|---|
| CN | 106104776 A | 11/2016 |
| CN | 206938118 U | 1/2018 |
| CN | 109021858 A | 12/2018 |
| CN | 218908227 U * | 4/2023 |
| DE | 2024177 A1 | 11/1970 |
| EP | 151873 A2 | 8/1985 |
| EP | 0987290 A1 | 3/2000 |
| EP | 2635428 A2 | 9/2013 |
| EP | 1786677 B1 | 6/2014 |
| GB | 956874 A | 4/1964 |
| GB | 1269542 A | 4/1972 |
| JP | 56051319 A | 5/1981 |
| JP | 2008540170 A | 11/2008 |
| JP | 2018187935 A | 11/2018 |
| KR | 10-2006-0106426 A | 10/2006 |
| WO | 9631571 A1 | 10/1996 |
| WO | 9735910 A1 | 10/1997 |
| WO | 2006012564 A2 | 2/2006 |
| WO | 2006122064 A2 | 11/2006 |
| WO | 2012061768 A2 | 5/2012 |
| WO | 2021257530 A1 | 12/2021 |

OTHER PUBLICATIONS

The EVAL website published online by Kuraray America Inc. at https://eval.kuraray.com/products-services/about-eval-evoh/properties/barrier-to-oxygen/ (Year: 2024).*

Comyn, J., Polymer Permeability, Chapman & Hall, (Year: 1994).*

International Search Report and Written Opinion for PCT Application No. PCT/US2021/037372, dated Oct. 5, 2021, 9 pages.

Supplementary European Search Report for European Application No. 21825957.0, dated Jul. 5, 2024, 1 page.

* cited by examiner

MULTIFUNCTIONAL FILM

CROSS-REFERENCE TO RELATED APPLICATION(S)

This application claims priority under 35 U.S.C. § 119(e) to U.S. Provisional Patent Application No. 63/040,947, entitled "MULTIFUNCTIONAL FILM," filed Jun. 18, 2020, naming as inventors Steven R. Dubrule et al., which is assigned to the current assignee hereof and incorporated herein by reference in its entirety.

FIELD OF THE DISCLOSURE

The present disclosure relates to a multifunctional film, in particular to a multifunction film for use in forming a vacuum bag.

BACKGROUND

Vacuum bags are commonly used in the production (e.g., curing) of various components, such as, airplane components. Such vacuum bags are commonly made up of multiple distinct and separate layers of materials that are used to form the vacuum bag. The distinct and separate layers facilitate high temperature curing of the components enclosed within the vacuum bag at high pressure while ensuring that the vacuum bag does not adhere to component. However, the production and use of separate layers to form the vacuum bag increases manual labor and cost for production and use of the vacuum bags. Accordingly, improved multifunction films that can replace multiple layers of materials in the production of a vacuum bag would be desirable.

SUMMARY

According to a first aspect, a multifunctional film for a vacuum bag may include a flexible barrier film that may include a textured surface. The multifunctional film may further include a release coating overlying the textured surface of the flexible barrier film. The multifunctional film may further have an oxygen ($O_2$) permeability of not greater than about 1100 cc/($m^2$-day-atm) and a stability rating of not greater than about 90%, where the stability rating is defined as the maximum percent decrease in elongation at break as measured using ASTM D882 after being exposed to a temperature of 200° C. for 12 hours.

According to yet another aspect, a multifunctional film for a vacuum bag may include a flexible barrier film that may include a textured surface. The multifunctional film may further include a release coating overlying the textured surface of the flexible barrier film. The flexible barrier film may have an oxygen ($O_2$) permeability of not greater than about 1100 cc/($m^2$-day-atm). The multifunctional film may further have a stability rating of not greater than about 90%, where the stability rating is defined as the maximum percent decrease in elongation at break as measured using ASTM D882 after being exposed to a temperature of 200° C. for 12 hours.

According to still another aspect, a multifunctional film for a vacuum bag may include a flexible barrier film that may include a textured surface. The multifunctional film may further include a release coating overlying the textured surface of the flexible barrier film. The flexible barrier film may include a nylon resin grade material, a fluoropolymer material, a polyethylene material, a polypropylene material, a polyolefin material, or any combination thereof. The release coating may include a silicone-based material, an acrylic-based material, a urethane-based material, a urethane-acrylate based material, a fluoropolymer-based material, or a combination thereof.

According to another aspect, a vacuum bag may include a multifunctional film. The multifunctional film may include a flexible barrier film that may include a textured surface. The multifunctional film may further include a release coating overlying the textured surface of the flexible barrier film. The multifunctional film may further have an oxygen ($O_2$) permeability of not greater than about 1100 cc/($m^2$-day-atm) and a stability rating of not greater than about 90%, where the stability rating is defined as the maximum percent decrease in elongation at break as measured using ASTM D882 after being exposed to a temperature of 200° C. for 12 hours.

According to yet another aspect, a vacuum bag may include a multifunctional film. The multifunctional film may include a flexible barrier film that may include a textured surface. The multifunctional film may further include a release coating overlying the textured surface of the flexible barrier film. The flexible barrier film may have an oxygen ($O_2$) permeability of not greater than about 1100 cc/($m^2$-day-atm). The multifunctional film may further have a stability rating of not greater than about 90%, where the stability rating is defined as the maximum percent decrease in elongation at break as measured using ASTM D882 after being exposed to a temperature of 200° C. for 12 hours.

According to still another aspect, a vacuum bag may include a multifunctional film. The multifunctional film may include a flexible barrier film that may include a textured surface. The multifunctional film may further include a release coating overlying the textured surface of the flexible barrier film. The flexible barrier film may include a nylon resin grade material, a fluoropolymer material, a polyethylene material, a polypropylene material, a polyolefin material, or any combination thereof. The release coating may include a silicone-based material, an acrylic-based material, a urethane-based material, a urethane-acrylate based material, a fluoropolymer-based material, or a combination thereof.

According to yet another aspect, a method of forming a multifunctional film for a vacuum bag may include providing a flexible barrier film, embossing a textured surface onto a first side of the flexible barrier film and coating the textured surface of the flexible barrier film with a release coating. The multifunctional film may further have an oxygen ($O_2$) permeability of not greater than about 1100 cc/($m^2$-day-atm) and a stability rating of not greater than about 90%, where the stability rating is defined as the maximum percent decrease in elongation at break as measured using ASTM D882 after being exposed to a temperature of 200° C. for 12 hours.

According to yet another aspect, a method of forming a multifunctional film for a vacuum bag may include providing a flexible barrier film, embossing a textured surface onto a first side of the flexible barrier film and coating the textured surface of the flexible barrier film with a release coating. The flexible barrier film may have an oxygen ($O_2$) permeability of not greater than about 1100 cc/($m^2$-day-atm). The multifunctional film may further have a stability rating of not greater than about 90%, where the stability rating is defined as the maximum percent decrease in elongation at break as measured using ASTM D882 after being exposed to a temperature of 200° C. for 12 hours.

According to yet another aspect, a method of forming a multifunctional film for a vacuum bag may include providing a flexible barrier film, embossing a textured surface onto a first side of the flexible barrier film and coating the textured surface of the flexible barrier film with a release coating. The flexible barrier film may include a nylon resin grade material, a fluoropolymer material, a polyethylene material, a polypropylene material, a polyolefin material, or any combination thereof. The release coating may include a silicone-based material, an acrylic-based material, a urethane-based material, a urethane-acrylate based material, a fluoropolymer-based material, or a combination thereof.

BRIEF DESCRIPTION OF THE DRAWINGS

Embodiments are illustrated by way of example and are not limited to the accompanying figures.

Skilled artisans appreciate that elements in the figures are illustrated for simplicity and clarity and have not necessarily been drawn to scale.

DETAILED DESCRIPTION

The following discussion will focus on specific implementations and embodiments of the teachings. The detailed description is provided to assist in describing certain embodiments and should not be interpreted as a limitation on the scope or applicability of the disclosure or teachings. It will be appreciated that other embodiments can be used based on the disclosure and teachings as provided herein.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Embodiments described herein are generally directed to a multifunctional film for a vacuum bag. According to certain embodiments, the multifunction film may include a flexible barrier film that may include a textured surface. The multifunctional film may further include a release coating overlying the textured surface of the flexible barrier film.

Figure 1:
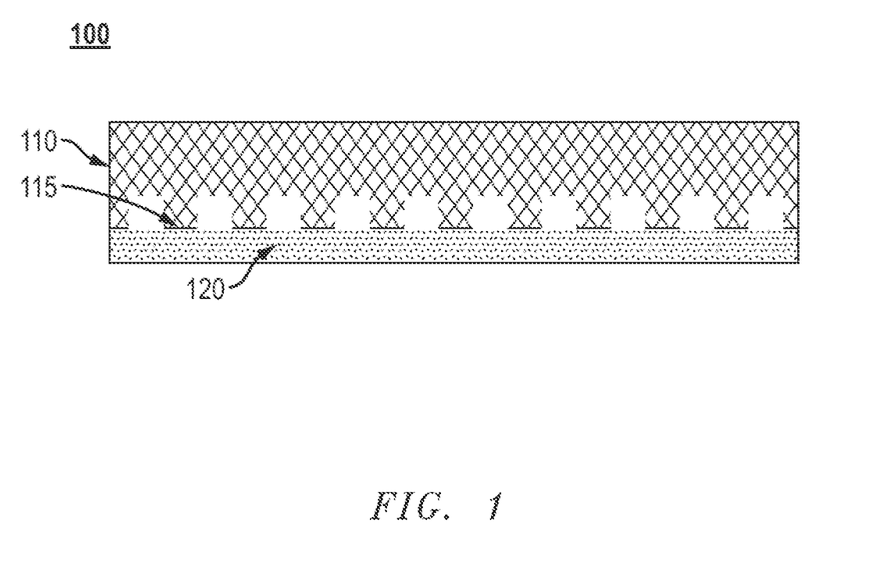
FIG. 1 includes an illustration showing a diagram of a multifunctional film according to embodiments described herein.

For purposes of illustration, FIG. 1 shows a multifunctional film 100 according to embodiments described herein. As shown in FIG. 1, a multifunctional film 100 may include a flexible barrier film 110 and a release coating 120. The flexible barrier film 110 may include a textured surface 115 and the release coating 120 may be overlying the textured surface 115 of the flexible barrier film 110.

According to particular embodiments, the multifunctional film 100 may have a particular oxygen ($O_2$) permeability as measured according to ASTM F3945. For example, the multifunctional film 100 may have an oxygen ($O_2$) permeability of not greater than about 1100 cc/($m^2$-day-atm), such as, not greater than about 1000 cc/($m^2$-day-atm) or not greater than about 900 cc/($m^2$-day-atm) or not greater than about 800 cc/($m^2$-day-atm) or not greater than about 700 cc/($m^2$-day-atm) or not greater than about 600 cc/($m^2$-day-atm) or not greater than about 500 cc/($m^2$-day-atm) or not greater than about 400 cc/($m^2$-day-atm) or not greater than about 300 cc/($m^2$-day-atm) or not greater than about 200 cc/($m^2$-day-atm) or not greater than about 100 cc/($m^2$-day-atm). According to still other embodiments, the multifunctional film 100 may have an oxygen ($O_2$) permeability of not greater than about 1100 cc/($m^2$-day-atm), such as, not greater than about 1000 cc/($m^2$-day-atm) or not greater than about 900 cc/($m^2$-day-atm) or not greater than about 800 cc/($m^2$-day-atm) or not greater than about 700 cc/($m^2$-day-atm) or not greater than about 600 cc/($m^2$-day-atm) or not greater than about 500 cc/($m^2$-day-atm) or not greater than about 400 cc/($m^2$-day-atm) or not greater than about 300 cc/($m^2$-day-atm) or not greater than about 200 cc/($m^2$-day-atm) or not greater than about 100 cc/($m^2$-day-atm). It will be appreciated that the oxygen ($O_2$) permeability of the multifunctional film 100 may be within a range between any of the minimum and maximum values noted above. It will be further appreciated that the oxygen ($O_2$) permeability of the multifunctional film 100 may be any value between any of the minimum and maximum values noted above.

According to still other embodiments, the multifunctional film 100 may have a particular stability rating. For purposes of embodiments described herein, the stability rating is defined as the maximum percent decrease in elongation at break as measured using ASTM D882 after being exposed to a temperature of 200° C. for 12 hours. According to certain embodiments, the multifunctional film 100 may have a stability rating of not greater than about 90%, such as, not greater than about 88% or not greater than about 85% or not greater than about 83% or not greater than about 80% or not greater than about 78% or not greater than about 75% or not greater than about 73% or even not greater than about 70%. It will be appreciated that the stability rating of the multifunctional film 100 may be within a range between any of the values noted above. It will be further appreciated that the stability rating of the multifunctional film 100 may be any value between any of the minimum and maximum values noted above.

According to still other embodiments, the multifunctional film 100 may have a particular Young's modulus as measured according ASTM D882. For example, the multifunctional film 100 may have a Young's modulus of at least about 10 MPa, such as, at least about 50 MPa or at least about 100 MPa or at least about 150 MPa or at least about 200 MPa or at least about 250 MPa or at least about 300 MPa or at least about 350 MPa or at least about 400 MPa or at least about 450 MPa or even at least about 500 MPA. According to still other embodiments, the multifunctional film 100 may have a Young's modulus of not greater than about 10,000 MPa, such as, not greater than about 9,000 MPa or not greater than about 8,000 MPa or not greater than about 7,000 MPa or not greater than about 6,000 MPa or not greater than about 5,000 MPa or not greater than about 4,000 MPa or not greater than about 3,000 MPa or not greater than about 2,000 MPa. It will be appreciated that the Young's modulus of the multifunctional film 100 may be within a range between any of the minimum and maximum values noted above. It will be further appreciated that the Young's modulus of the multifunctional film 100 may be any value between any of the minimum and maximum values noted above.

According to yet other embodiments, the multifunctional film 100 may have a particular elongation before break as measured according to ASTM D882. For example, the multifunctional film 100 may have an elongation before break of at least about 1%, such as, at least about 2% or at least about 3% or at least about 4% or at least about 5% or at least about 6% or at least about 7% or at least about 8% or at least about 9% or even at least ab out 10%. According to still other embodiments, the multifunctional film 100 may have an elongation before break of not greater than about 2000% or not greater than about 1500% or not greater than about 1000% or not greater than about 500% or not greater than about 100% or not greater than about 90% or not greater than about 80% or not greater than about 70% or not greater than about 60% or not greater than about 50% or not greater than about 40% or not greater than about 30%. It will be appreciated that the elongation before break of the multifunctional film 100 may be within a range between any of the minimum and maximum values noted above. It will be further appreciated that the elongation before break of the multifunctional film 100 may be any value between any of the minimum and maximum values noted above.

According to still other embodiments, the multifunctional film 100 may have a particular release coating thickness ratio $RC_T/FBF_T$, where $RC_T$ is the thickness of the release coating and $FBF_T$ is the thickness of the flexible barrier film. For example, the multifunctional film 100 may have a release coating thickness ratio $RC_T/FBF_T$ of not greater than about 16, such as, not greater than about 15 or not greater than about 14 or not greater than about 13 or not greater than about 12 or not greater than about 11 or not greater than about 10 or not greater than about 9 or not greater than about 8 or not greater than about 7 or not greater than about 6 or not greater than about 5 or not greater than about 4 or not greater than about 3 or not greater than about 2 or not greater than about 1.5 or even not greater than about 1.1. According to still other embodiments, the multifunctional film 100 may have a release coating thickness ratio $RC_T/FBF_T$ of at least about 0.00001, such as, at least about 0.00002 or at least about 0.00003 or at least about 0.00004 or at least about 0.00005 or at least about 0.00006 or at least about 0.00007 or at least about 0.00008 or at least about 0.00009 or at least about 0.0001 or at least about 0.00015 or even at least about 0.0002. It will be appreciated that the release coating thickness ratio $RC_T/FBF_T$ of the multifunctional film 100 may be within a range between any of the minimum and maximum values noted above. It will be further appreciated that the release coating thickness ratio $RC_T/FBF_T$ of the multifunctional film 100 may be any value between any of the minimum and maximum values noted above.

According to still other embodiments, the flexible barrier film 110 may include a particular material. For example, the flexible barrier film 110 may include a nylon resin grade material, a fluoropolymer material, a polyethylene material, a polypropylene material, a polyolefin material, or any combination thereof. According to yet other embodiments, the flexible barrier film 110 may consist of a nylon resin grade material, a fluoropolymer material, a polyethylene material, a polypropylene material, a polyolefin material, or any combination thereof.

According to yet other embodiments, the flexible barrier film 110 may include a particular nylon resin grade material. For example, the flexible barrier film 110 may include Nylon 6, Nylon 6,6, Nylon 6,4, Nylon 6, 66, Nylon MXD6, PAMACM12, PA6I, PA6I/6T or any combination thereof. According to still other embodiments, the flexible barrier film 110 may consist of Nylon 6, Nylon 6,6, Nylon 6,4, Nylon 6, 66, Nylon MXD6, PAMACM12, PA6I, PA6I/6T or any combination thereof.

According to certain embodiments, the flexible barrier film 110 may have a particular thickness. For example, the flexible barrier film 110 may have a thickness of at least about 0.2 mil, such as, at least about 0.3 mil or at least about 0.4 mil or at least about 0.5 mil or at least about 0.6 mil or at least about 0.7 mil or at least about 0.8 mil or at least about 0.9 mil or even at least about 1.0 mil. According to still other embodiments, the flexible barrier film 110 may have a thickness of not greater than about 30 mils, such as, not greater than about 25 mils or not greater than about 20 mils or not greater than about 15 mils or not greater than about 14 mils or not greater than about 13 mils or not greater than about 12 mils or not greater than about 11 mils or not greater than about 10 mils or not greater than about 9 mils or even not greater than about 8 mils. It will be appreciated that the thickness of the flexible barrier film 110 may be within a range between any of the minimum and maximum values noted above. It will be further appreciated that the thickness of the flexible barrier film 110 may be any value between any of the minimum and maximum values noted above.

According to still other embodiments, the release coating 120 may include a particular material. For example, the release coating 120 may include a silicon-based material, a fluoropolymer-based material, acrylic-based material, a urethane-based material, a urethane-acrylate based material, or a combination thereof. According to yet other embodiments, the release coating 120 may consist of a silicon-based material, a fluoropolymer-based material, acrylic-based material, a urethane-based material, a urethane-acrylate based material, or a combination thereof.

According to still other embodiments, the release coating 120 may further include a particular hardcoat. For example, the release coating 120 may further include a polyfunctional acrylic-based UV-curable coating or a polyfunctional acrylic-based thermal-curable coating.

According to yet other embodiments, the release coating 120 may have a particular release force as measured using a 180 degree peel release test on a 2 inch by 6 inch sample. For example, the release coating may have a release force of not greater than about 100 g/inch, such as, not greater than about 95 g/inch or not greater than about 90 g/inch or not greater than about 85 g/inch or not greater than about 80 g/inch or not greater than about 75 g/inch or not greater than about 70 g/inch or not greater than about 65 g/inch or not greater than about 60 g/inch or not greater than about 55 g/inch or not greater than about 50 g/inch or not greater than about 45 g/inch or even not greater than about 40 g/inch. It will be appreciated that the release force of the release coating 120 may be within a range between any of the values noted above. It will be further appreciated that the release force of the release coating 120 may be any value between any of the values noted above.

According to certain embodiments, the release coating 120 may have a particular thickness. For example, the release coating 120 may have a thickness of at least about 0.01 microns, such as, at least about 0.02 microns or at least about 0.03 microns or at least about 0.04 microns or at least about 0.05 microns or at least about 0.06 microns or at least about 0.07 microns or at least about 0.08 microns or at least about 0.09 microns or even at least about 0.1 microns. According to still other embodiments, the release coating 120 may have a thickness of not greater than about 100 microns, such as, not greater than about 90 microns or not greater than about 80 microns or not greater than about 70 microns or not greater than about 60 microns or not greater than about 50 microns or not greater than about 40 microns or not greater than about 30 microns or not greater than about 20 microns or not greater than about 10 microns or not greater than about 9 microns or not greater than about 8 microns or not greater than about 7 microns or not greater than about 6 microns or even not greater than about 5 microns. It will be appreciated that the thickness of the release coating 120 may be within a range between any of the minimum and maximum values noted above. It will be further appreciated that the thickness of the release coating 120 may be any value between any of the minimum and maximum values noted above.

According to still other embodiments, the textured surface 115 may include a repeating pattern of channels. According to yet other embodiments, the repeating pattern of channels may be in the form of a cross-hatch pattern. According to still other embodiments, the repeating pattern of channels may be in the form of a weave pattern. According to yet other embodiments, the repeating pattern of channels may have an isotropic orientation. According to yet other embodiments, the repeating pattern of channels may have an anisotropic orientation.

According to yet other embodiments, the channels of the textured surface 115 may have a particular average channel width $AC_W$. For example, the channels may have an average channel width $AC_W$ of at least about 0.1 mm, such as, at least about 0.2 mm or at least about 0.3 mm or at least about 0.4 mm or at least about 0.5 mm or at least about 0.6 mm or at least about 0.7 mm or at least about 0.8 mm or at least about 0.9 mm or even at least about 1.0 mm. According to yet other embodiments, the channels may have an average channel width $AC_W$ of not greater than about 100 mm, such as, not greater than about 90 mm or not greater than about 80 mm or not greater than about 70 mm or not greater than about 60 mm or not greater than about 50 mm or not greater than about 40 mm or not greater than about 30 mm or not greater than about 25 mm or not greater than about 20 mm or even not greater than about 15 mm. It will be appreciated that the average channel width $AC_W$ of the channels may be within a range between any of the minimum and maximum values noted above. It will be further appreciated that the average channel width $AC_W$ may be any value between any of the minimum and maximum values noted above.

According to yet other embodiments, the channels of the textured surface 115 may have a particular average channel depth $AC_D$. For example, the channels may have an average channel depth $AC_D$ of at least about 1 micron, such as, at least about 1.1 microns or at least about 1.2 microns or at least about 1.3 microns. According to yet other embodiments, the channels may have an average channel depth $AC_D$ of not greater than about 500 mils, such as, not greater than about 450 mils or not greater than about 400 mils or not greater than about 350 mils or not greater than about 300 mils or not greater than about 250 mils or not greater than about 200 mils or not greater than about 200 mils or not greater than about 150 mils or not greater than about 100 mils or not greater than about 75 mils or not greater than about 50 mils or not greater than about 25 mils. It will be appreciated that the average channel depth $AC_D$ of the channels may be within a range between any of the minimum and maximum values noted above. It will be further appreciated that the average channel depth $AC_D$ may be any value between any of the minimum and maximum values noted above.

Figure 2:
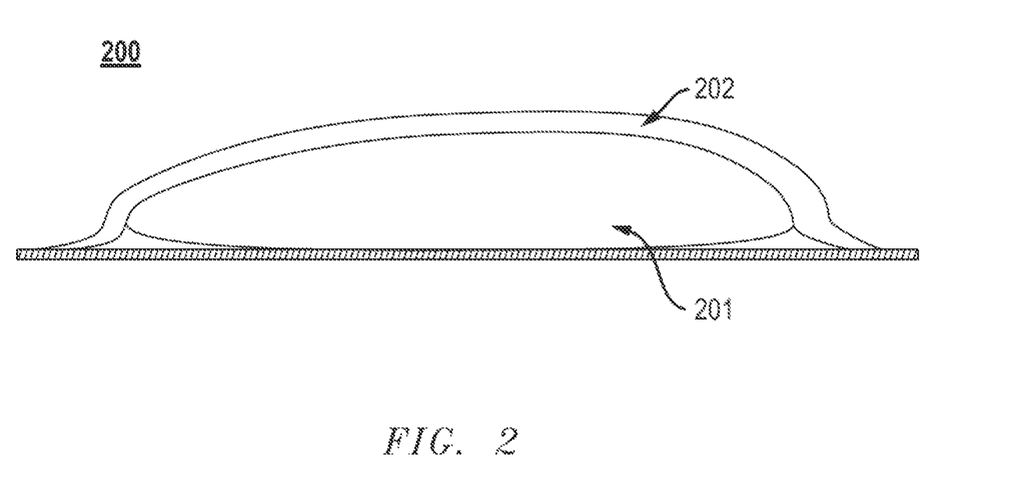
FIG. 2 includes an illustration showing a diagram of a vacuum bag that includes a multifunctional film according to embodiments described herein.

It will be appreciated that the multifunctional film 100 may be used to form a vacuum bag. For purposes of illustration, FIG. 2 shows a vacuum bag 200 that include a multifunctional film 201 overlying and enclosing a component 202 on a surface 203. For purposes of embodiments described herein, the multifunctional film 201 used to form the vacuum bag 200 may have any of the attributes or characteristics described in reference to the multifunctional film 100 described in reference to FIG. 1 above. According to embodiments described herein, the components 202 may be any component part that can be formed, for example cured, while being enclosed within a vacuum bag 200.

According to particular embodiments, the vacuum bag 200 may have a particular oxygen ($O_2$) permeability as measured according to ASTM F3945. For example, the vacuum bag 200 may have an oxygen ($O_2$) permeability of not greater than about 1100 cc/($m^2$-day-atm), such as, not greater than about 1000 cc/($m^2$-day-atm) or not greater than about 900 cc/($m^2$-day-atm) or not greater than about 800 cc/($m^2$-day-atm) or not greater than about 700 cc/($m^2$-day-atm) or not greater than about 600 cc/($m^2$-day-atm) or not greater than about 500 cc/($m^2$-day-atm) or not greater than about 400 cc/($m^2$-day-atm) or not greater than about 300 cc/($m^2$-day-atm) or not greater than about 200 cc/($m^2$-day-atm) or not greater than about 100 cc/($m^2$-day-atm). According to still other embodiments, the vacuum bag 200 may have an oxygen ($O_2$) permeability of not greater than about 1100 cc/($m^2$-day-atm), such as, not greater than about 1000 cc/($m^2$-day-atm) or not greater than about 900 cc/($m^2$-day-atm) or not greater than about 800 cc/($m^2$-day-atm) or not greater than about 700 cc/($m^2$-day-atm) or not greater than about 600 cc/($m^2$-day-atm) or not greater than about 500 cc/($m^2$-day-atm) or not greater than about 400 cc/($m^2$-day-atm) or not greater than about 300 cc/($m^2$-day-atm) or not greater than about 200 cc/($m^2$-day-atm) or not greater than about 100 cc/($m^2$-day-atm). It will be appreciated that the oxygen ($O_2$) permeability of the vacuum bag 200 may be within a range between any of the minimum and maximum values noted above. It will be further appreciated that the oxygen ($O_2$) permeability of the vacuum bag 200 may be any value between any of the minimum and maximum values noted above.

According to still other embodiments, the vacuum bag 200 may have a particular stability rating. For purposes of embodiments described herein, the stability rating is defined as the maximum percent decrease in elongation at break as measured using ASTM D882 after being exposed to a temperature of 200° C. for 12 hours. According to certain embodiments, the vacuum bag 200 may have a stability rating of not greater than about 90%, such as, not greater than about 88% or not greater than about 85% or not greater than about 83% or not greater than about 80% or not greater than about 78% or not greater than about 75% or not greater than about 73% or even not greater than about 70%. It will be appreciated that the stability rating of the vacuum bag 200 may be within a range between any of the values noted above. It will be further appreciated that the stability rating of the vacuum bag 200 may be any value between any of the minimum and maximum values noted above.

According to still other embodiments, the vacuum bag 200 may have a particular Young's modulus as measured according ASTM D882. For example, the vacuum bag 200 may have a Young's modulus of at least about 10 MPa, such as, at least about 50 MPa or at least about 100 MPa or at least about 150 MPa or at least about 200 MPa or at least about 250 MPa or at least about 300 MPa or at least about 350 MPa or at least about 400 MPa or at least about 450 MPa or even at least about 500 MPA. According to still other embodiments, the vacuum bag 200 may have a Young's modulus of not greater than about 10,000 MPa, such as, not greater than about 9,000 MPa or not greater than about 8,000 MPa or not greater than about 7,000 MPa or not greater than about 6,000 MPa or not greater than about 5,000 MPa or not greater than about 4,000 MPa or not greater than about 3,000 MPa or not greater than about 2,000 MPa. It will be appreciated that the Young's modulus of the vacuum bag 200 may be within a range between any of the minimum and maximum values noted above. It will be further appreciated that the Young's modulus of the vacuum bag 200 may be any value between any of the minimum and maximum values noted above.

According to yet other embodiments, the vacuum bag 200 may have a particular elongation before break as measured according to ASTM D882. For example, the vacuum bag 200 may have an elongation before break of at least about 1%, such as, at least about 2% or at least about 3% or at least about 4% or at least about 5% or at least about 6% or at least about 7% or at least about 8% or at least about 9% or even at least about 10%. According to still other embodiments, the vacuum bag 200 may have an elongation before break of not greater than about 2000% or not greater than about 1500% or not greater than about 1000% or not greater than about 500% or not greater than about 100% or not greater than about 90% or not greater than about 80% or not greater than about 70% or not greater than about 60% or not greater than about 50% or not greater than about 40% or not greater than about 30%. It will be appreciated that the elongation before break of the vacuum bag 200 may be within a range between any of the minimum and maximum values noted above. It will be further appreciated that the elongation before break of the vacuum bag 200 may be any value between any of the minimum and maximum values noted above.

Figure 3:
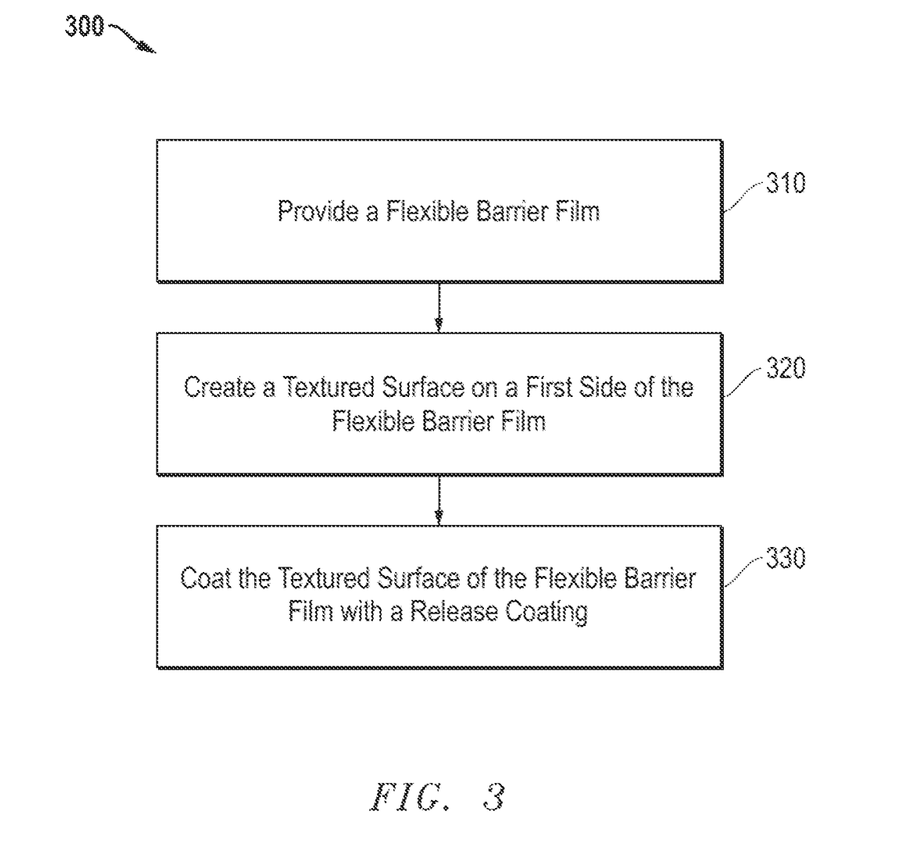
FIG. 3 includes a flow chart showing a method for forming a multifunctional film according to embodiments described herein.

FIG. 3 includes a flow chart showing a method for forming a multifunctional film 100 as described herein. According to particular embodiments described herein and as shown in FIG. 3, a method 300 of forming a multifunctional film may include a first step 310 of providing a flexible barrier film, a second step 320 of creating a textured surface on a first side of the flexible barrier film, a third step 330 of coating the textured surface of the flexible barrier film with a release coating.

According to certain embodiments, the second step 320 of creating the textured surface on the first side of the flexible barrier film may include embossing the textured surface on the first side of the flexible barrier film. According to still other embodiments, the second step 320 of creating the textured surface on the first side of the flexible barrier film may include thermally embossing the textured surface on the first side of the flexible barrier film.

According to yet other embodiments, the third step 330 of coating the texture surface of the flexible barrier film with a release coating may include gravure coating (reverse or forward), slot die coating, roll coating (reverse or forward), spray coating, mayer rod coating, or flood coating.

According to still other embodiments, the method 300 may, when necessary, further include a step (not shown in FIG. 3) of curing the coating on the textured surface of the flexible barrier film.

According to certain embodiments, curing may occur at a temperature of not greater than about 200° C., such as, not greater than about 190° C. or even not greater than about 180° C. According to still other embodiments, curing may occur for 12 hours.

According to particular embodiments, the multifunctional film formed according to method 300 may have a particular oxygen ($O_2$) permeability as measured according to ASTM F3945. For example, the multifunctional film formed according to method 300 may have an oxygen ($O_2$) permeability of not greater than about 1100 cc/($m^2$-day-atm), such as, not greater than about 1000 cc/($m^2$-day-atm) or not greater than about 900 cc/($m^2$-day-atm) or not greater than about 800 cc/($m^2$-day-atm) or not greater than about 700 cc/($m^2$-day-atm) or not greater than about 600 cc/($m^2$-day-atm) or not greater than about 500 cc/($m^2$-day-atm) or not greater than about 400 cc/($m^2$-day-atm) or not greater than about 300 cc/($m^2$-day-atm) or not greater than about 200 cc/($m^2$-day-atm) or not greater than about 100 cc/($m^2$-day-atm). According to still other embodiments, the multifunctional film formed according to method 300 may have an oxygen ($O_2$) permeability of not greater than about 1100 cc/($m^2$-day-atm), such as, not greater than about 1000 cc/($m^2$-day-atm) or not greater than about 900 cc/($m^2$-day-atm) or not greater than about 800 cc/($m^2$-day-atm) or not greater than about 700 cc/($m^2$-day-atm) or not greater than about 600 cc/($m^2$-day-atm) or not greater than about 500 cc/($m^2$-day-atm) or not greater than about 400 cc/($m^2$-day-atm) or not greater than about 300 cc/($m^2$-day-atm) or not greater than about 200 cc/($m^2$-day-atm) or not greater than about 100 cc/($m^2$-day-atm). It will be appreciated that the oxygen ($O_2$) permeability of the multifunctional film formed according to method 300 may be within a range between any of the minimum and maximum values noted above. It will be further appreciated that the oxygen ($O_2$) permeability of the multifunctional film formed according to method 300 may be any value between any of the minimum and maximum values noted above.

According to still other embodiments, the multifunctional film formed according to method 300 may have a particular stability rating. For purposes of embodiments described herein, the stability rating is defined as the maximum percent decrease in elongation at break as measured using ASTM D882 after being exposed to a temperature of 200° C. for 12 hours. According to certain embodiments, the multifunctional film formed according to method 300 may have a stability rating of not greater than about 90%, such as, not greater than about 88% or not greater than about 85% or not greater than about 83% or not greater than about 80% or not greater than about 78% or not greater than about 75% or not greater than about 73% or even not greater than about 70%. It will be appreciated that the stability rating of the multifunctional film formed according to method 300 may be within a range between any of the values noted above. It will be further appreciated that the stability rating of the multifunctional film formed according to method 300 may be any value between any of the minimum and maximum values noted above.

According to still other embodiments, the multifunctional film formed according to method 300 may have a particular Young's modulus as measured according ASTM D882. For example, the multifunctional film formed according to method 300 may have a Young's modulus of at least about 10 MPa, such as, at least about 50 MPa or at least about 100 MPa or at least about 150 MPa or at least about 200 MPa or at least about 250 MPa or at least about 300 MPa or at least about 350 MPa or at least about 400 MPa or at least about 450 MPa or even at least about 500 MPA. According to still other embodiments, the multifunctional film formed according to method 300 may have a Young's modulus of not greater than about 10,000 MPa, such as, not greater than about 9,000 MPa or not greater than about 8,000 MPa or not greater than about 7,000 MPa or not greater than about 6,000 MPa or not greater than about 5,000 MPa or not greater than about 4,000 MPa or not greater than about 3,000 MPa or not greater than about 2,000 MPa. It will be appreciated that the Young's modulus of the multifunctional film formed according to method 300 may be within a range between any of the minimum and maximum values noted above. It will be further appreciated that the Young's modulus of the multifunctional film formed according to method 300 may be any value between any of the minimum and maximum values noted above.

According to yet other embodiments, the multifunctional film formed according to method 300 may have a particular elongation before break as measured according to ASTM D882. For example, the multifunctional film formed according to method 300 may have an elongation before break of at least about 1%, such as, at least about 2% or at least about 3% or at least about 4% or at least about 5% or at least about 6% or at least about 7% or at least about 8% or at least about 9% or even at least about 10%. According to still other embodiments, the multifunctional film formed according to method 300 may have an elongation before break of not greater than about 2000% or not greater than about 1500% or not greater than about 1000% or not greater than about 500% or not greater than about 100% or not greater than about 90% or not greater than about 80% or not greater than about 70% or not greater than about 60% or not greater than about 50% or not greater than about 40% or not greater than about 30%. It will be appreciated that the elongation before break of the multifunctional film formed according to method 300 may be within a range between any of the minimum and maximum values noted above. It will be further appreciated that the elongation before break of the multifunctional film formed according to method 300 may be any value between any of the minimum and maximum values noted above.

According to still other embodiments, the multifunctional film formed according to method 300 may have a particular release coating thickness ratio $RC_T/FBF_T$, where $RC_T$ is the thickness of the release coating and $FBF_T$ is the thickness of the flexible barrier film. For example, the multifunctional film formed according to method 300 may have a release coating thickness ratio $RC_T/FBF_T$ of not greater than about 16, such as, not greater than about 15 or not greater than about 14 or not greater than about 13 or not greater than about 12 or not greater than about 11 or not greater than about 10 or not greater than about 9 or not greater than about 8 or not greater than about 7 or not greater than about 6 or not greater than about 5 or not greater than about 4 or not greater than about 3 or not greater than about 2 or not greater than about 1.5 or even not greater than about 1.1. According to still other embodiments, the multifunctional film formed according to method 300 may have a release coating thickness ratio $RC_T/FBF_T$ of at least about 0.00001, such as, at least about 0.00002 or at least about 0.00003 or at least about 0.00004 or at least about 0.00005 or at least about 0.00006 or at least about 0.00007 or at least about 0.00008 or at least about 0.00009 or at least about 0.0001 or at least about 0.00015 or even at least about 0.0002. It will be appreciated that the release coating thickness ratio $RC_T/FBF_T$ of the multifunctional film formed according to method 300 may be within a range between any of the minimum and maximum values noted above. It will be further appreciated that the release coating thickness ratio $RC_T/FBF_T$ of the multifunctional film formed according to method 300 may be any value between any of the minimum and maximum values noted above.

According to still other embodiments, the flexible barrier film of the multifunctional film formed according to method 300 may include a particular material. For example, the flexible barrier film may include a nylon resin grade material, a fluoropolymer material, a polyethylene material, a polypropylene material, a polyolefin material, or any combination thereof. According to yet other embodiments, the flexible barrier film may consist of a nylon resin grade material, a fluoropolymer material, a polyethylene material, a polypropylene material, a polyolefin material, or any combination thereof.

According to yet other embodiments, the flexible barrier film of the multifunctional film formed according to method 300 may include a particular nylon resin grade material. For example, the flexible barrier film may include Nylon 6, Nylon 6, 6, Nylon 6, 4, Nylon 6, 66, Nylon MXD6, PAMACM12, PA6I, PA6I/6T or any combination thereof. According to still other embodiments, the flexible barrier film may consist of Nylon 6, Nylon 6, 6, Nylon 6, 4, Nylon 6, 66, Nylon MXD6, PAMACM12, PA6I, PA6I/6T or any combination thereof.

According to certain embodiments, the flexible barrier film may have a particular thickness. For example, the flexible barrier film 110 may have a thickness of at least about 0.2 mil, such as, at least about 0.3 mil or at least about 0.4 mil or at least about 0.5 mil or at least about 0.6 mil or at least about 0.7 mil or at least about 0.8 mil or at least about 0.9 mil or even at least about 1.0 mil. According to still other embodiments, the flexible barrier film may have a thickness of not greater than about 30 mils, such as, not greater than about 25 mils or not greater than about 20 mils or not greater than about 15 mils or not greater than about 14 mils or not greater than about 13 mils or not greater than about 12 mils or not greater than about 11 mils or not greater than about 10 mils or not greater than about 9 mils or even not greater than about 8 mils. It will be appreciated that the thickness of the flexible barrier film may be within a range between any of the minimum and maximum values noted above. It will be further appreciated that the thickness of the flexible barrier film may be any value between any of the minimum and maximum values noted above.

According to still other embodiments, the release coating of the multifunctional film formed according to method 300 may include a particular material. For example, the release coating may include a silicon-based material, a fluoropolymer-based material, acrylic-based material, a urethane-based material, a urethane-acrylate based material, or a combination thereof. According to yet other embodiments, the release coating may consist of a silicon-based material, a fluoropolymer-based material, acrylic-based material, a urethane-based material, a urethane-acrylate based material, or a combination thereof.

According to still other embodiments, the release coating of the multifunctional film formed according to method 300 may further include a particular hardcoat. For example, the release coating of the multifunctional film formed according to method 300 may further include a polyfunctional acrylic-based UV-curable coating or a polyfunctional acrylic-based thermal-curable coating.

According to yet other embodiments, the release coating of the multifunctional film formed according to method 300 may have a particular release force as measured using a 180 degree peel release test on a 2 inch by 6 inch sample. For example, the release coating may have a release force of not greater than about 100 g/inch, such as, not greater than about 95 g/inch or not greater than about 90 g/inch or not greater than about 85 g/inch or not greater than about 80 g/inch or not greater than about 75 g/inch or not greater than about 70 g/inch or not greater than about 65 g/inch or not greater than about 60 g/inch or not greater than about 55 g/inch or not greater than about 50 g/inch or not greater than about 45 g/inch or even not greater than about 40 g/inch. It will be appreciated that the release force of the release coating 120 may be within a range between any of the values noted above. It will be further appreciated that the release force of the release coating 120 may be any value between any of the values noted above.

According to certain embodiments, the release coating of the multifunctional film formed according to method 300 may have a particular thickness. For example, the release coating may have a thickness of at least about 0.01 microns, such as, at least about 0.02 microns or at least about 0.03 microns or at least about 0.04 microns or at least about 0.05 microns or at least about 0.06 microns or at least about 0.07 microns or at least about 0.08 microns or at least about 0.09 microns or even at least about 0.1 microns. According to still other embodiments, the release coating may have a thickness of not greater than about 100 microns, such as, not greater than about 90 microns or not greater than about 80 microns or not greater than about 70 microns or not greater than about 60 microns or not greater than about 50 microns or not greater than about 40 microns or not greater than about 30 microns or not greater than about 20 microns or not greater than about 10 microns or not greater than about 9 microns or not greater than about 8 microns or not greater than about 7 microns or not greater than about 6 microns or even not greater than about 5 microns. It will be appreciated that the thickness of the release coating may be within a range between any of the minimum and maximum values noted above. It will be further appreciated that the thickness of the release coating may be any value between any of the minimum and maximum values noted above.

According to still other embodiments, the textured surface may include a repeating pattern of channels. According to yet other embodiments, the repeating pattern of channels may be in the form of a cross-hatch pattern. According to still other embodiments, the repeating pattern of channels may be in the form of a weave pattern. According to yet other embodiments, the repeating pattern of channels may have an isotropic orientation. According to yet other embodiments, the repeating pattern of channels may have an anisotropic orientation.

According to yet other embodiments, the channels of the textured surface may have a particular average channel width $AC_W$. For example, the channels may have an average channel width $AC_W$ of at least about 0.1 mm, such as, at least about 0.2 mm or at least about 0.3 mm or at least about 0.4 mm or at least about 0.5 mm or at least about 0.6 mm or at least about 0.7 mm or at least about 0.8 mm or at least about 0.9 mm or even at least about 1.0 mm. According to yet other embodiments, the channels may have an average channel width $AC_W$ of not greater than about 100 mm, such as, not greater than about 90 mm or not greater than about 80 mm or not greater than about 70 mm or not greater than about 60 mm or not greater than about 50 mm or not greater than about 40 mm or not greater than about 30 mm or not greater than about 25 mm or not greater than about 20 mm or even not greater than about 15 mm. It will be appreciated that the average channel width $AC_W$ of the channels may be within a range between any of the minimum and maximum values noted above. It will be further appreciated that the average channel width $AC_W$ may be any value between any of the minimum and maximum values noted above.

According to yet other embodiments, the channels of the textured surface may have a particular average channel depth $AC_D$. For example, the channels may have an average channel depth $AC_D$ of at least about 1 micron, such as, at least about 1.1 microns or at least about 1.2 microns or at least about 1.3 microns. According to yet other embodiments, the channels may have an average channel depth $AC_D$ of not greater than about 500 mils, such as, not greater than about 450 mils or not greater than about 400 mils or not greater than about 350 mils or not greater than about 300 mils or not greater than about 250 mils or not greater than about 200 mils or not greater than about 200 mils or not greater than about 150 mils or not greater than about 100 mils or not greater than about 75 mils or not greater than about 50 mils or not greater than about 25 mils. It will be appreciated that the average channel depth $AC_D$ of the channels may be within a range between any of the minimum and maximum values noted above. It will be further appreciated that the average channel depth $AC_D$ may be any value between any of the minimum and maximum values noted above.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1. A multifunctional film for a vacuum bag, wherein the multifunctional film comprises: a flexible barrier film comprising a textured surface; and a release coating overlying the textured surface of the flexible barrier film; wherein the multifunctional film has an oxygen ($O_2$) permeability of not greater than about 1100 cc/($m^2$-day-atm) and wherein the multifunctional film has a stability rating of not greater than about 90%, where the stability rating is defined as the maximum percent decrease in elongation at break as measured using ASTM D882 after being exposed to a temperature of 200° C. for 12 hours.

Embodiment 2. A multifunctional film for a vacuum bag, wherein the multifunctional film comprises: a flexible barrier film comprising a textured surface; and a release coating overlying the textured surface the flexible barrier film; wherein the flexible barrier film has an oxygen ($O_2$) permeability of not greater than about 1100 cc/($m^2$-day-atm) and wherein the multifunctional film has a stability rating of not greater than about 90%, where the stability rating is defined as the maximum percent decrease in elongation at break as measured using ASTM D882 after being exposed to a temperature of 200° C. for 12 hours.

Embodiment 3. A multifunctional film for a vacuum bag, wherein the multifunctional film comprises: a flexible barrier film comprising a textured surface; and a release coating overlying the textured surface the flexible barrier film, wherein the flexible barrier film comprises a nylon resin grade material, a fluoropolymer material, a polyethylene material, a polypropylene material, a polyolefin material, or any combination thereof; and wherein the release coating comprises a silicone-based material, an acrylic-based material, a urethane-based material, a urethane-acrylate based material, a fluoropolymer-based material, or a combination thereof.

Embodiment 4. The multifunctional film of any one of embodiments 2 and 3, wherein the multifunctional film has an oxygen ($O_2$) permeability of not greater than about 1100 cc/($m^2$-day-atm) or not greater than about 1000 cc/($m^2$-day-atm) or not greater than about 900 cc/($m^2$-day-atm) or not greater than about 800 cc/($m^2$-day-atm) or not greater than about 700 cc/($m^2$-day-atm) or not greater than about 600 cc/($m^2$-day-atm) or not greater than about 500 cc/($m^2$-day-atm) or not greater than about 400 cc/($m^2$-day-atm) or not greater than about 300 cc/($m^2$-day-atm) or not greater than about 200 cc/($m^2$-day-atm) or not greater than about 100 cc/($m^2$-day-atm).

Embodiment 5. The multifunctional film of any one of embodiments 1 and 3, wherein the flexible barrier film has an oxygen ($O_2$) permeability of not greater than about 1100 cc/($m^2$-day-atm) or not greater than about 1000 cc/($m^2$-day-atm) or not greater than about 900 cc/($m^2$-day-atm) or not greater than about 800 cc/($m^2$-day-atm) or not greater than about 700 cc/($m^2$-day-atm) or not greater than about 600 cc/($m^2$-day-atm) or not greater than about 500 cc/($m^2$-day-atm) or not greater than about 400 cc/($m^2$-day-atm) or not greater than about 300 cc/($m^2$-day-atm) or not greater than about 200 cc/($m^2$-day-atm) or not greater than about 100 cc/($m^2$-day-atm).

Embodiment 6. The multifunctional film of embodiment 3, wherein the multifunctional film has a stability rating of not greater than about 90%, where the stability rating is defined as the maximum percent decrease in elongation at break as measured using ASTM D882 after being exposed to a temperature of 200° C. for 12 hours.

Embodiment 7. The multifunctional film of any one of embodiments 1, 2, and 3, wherein the release coating has a release force of not greater than about 100 g/inch or not greater than about 95 g/inch or not greater than about 90 g/inch or not greater than about 85 g/inch or not greater than about 80 g/inch or not greater than about 75 g/inch or not greater than about 70 g/inch or not greater than about 65 g/inch or not greater than about 60 g/inch or not greater than about 55 g/inch or not greater than about 50 g/inch or not greater than about 45 g/inch or not greater than about 40 g/inch.

Embodiment 8. The multifunctional film of any one of embodiments 1, 2, and 3, wherein the multifunctional film comprises a Young's modulus of at least about 10 MPa or at least about 50 MPa or at least about 100 MPa or at least about 150 MPa or at least about 200 MPa or at least about 250 MPa or at least about 300 MPa or at least about 350 MPa or at least about 400 MPa or at least about 450 MPa or at least about 500 MPA.

Embodiment 9. The multifunctional film of any one of embodiments 1, 2, and 3, wherein the multifunctional film comprises a Young's modulus of not greater than about 10,000 MPa or not greater than about 9,000 MPa or not greater than about 8,000 MPa or not greater than about 7,000 MPa or not greater than about 6,000 MPa or not greater than about 5,000 MPa or not greater than about 4,000 MPa or not greater than about 3,000 MPa or not greater than about 2,000 MPa.

Embodiment 10. The multifunctional film of any one of embodiments 1, 2, and 3, wherein the multifunctional film comprises an elongation before break of at least about 1% or at least about 2% or at least about 3% or at least about 4% or at least about 5% or at least about 6% or at least about 7% or at least about 8% or at least about 9% or at least about 10%.

Embodiment 11. The multifunctional film of any one of embodiments 1, 2, and 3, wherein the multifunctional film comprises an elongation before break of not greater than about 2000% or not greater than about 1500% or not greater than about 1000% or not greater than about 500% or not greater than about 100% or not greater than about 90% or not greater than about 80% or not greater than about 70% or not greater than about 60% or not greater than about 50% or not greater than about 40% or not greater than about 30%.

Embodiment 12. The multifunctional film of any one of embodiments 1 and 2, wherein the flexible barrier film comprises a nylon resin grade material, a fluoropolymer material, a polyethylene material, a polypropylene material, a polyolefin material, or any combination thereof.

Embodiment 13. The multifunctional film of any one of embodiments 3 and 12, wherein the nylon resin grade material comprises Nylon 6, Nylon 6,6, Nylon 6,4, Nylon 6, 66, Nylon MXD6, PAMACM12, PA6I, PA6I/6T or any combination thereof.

Embodiment 14. The multifunctional film of any one of embodiments 1 and 2, wherein the release coating comprises a silicon-based material, a fluoropolymer-based material, acrylic-based material, a urethane-based material, a urethane-acrylate based material or a combination thereof.

Embodiment 15. The multifunctional film of any one of embodiments 3 and 14, wherein the release coating comprises polyfunctional acrylic-based UV-curable coating or a polyfunctional acrylic-based thermal-curable coating.

Embodiment 16. The multifunctional film of any one of embodiments 1, 2, and 3, wherein the multifunctional film comprises a release coating thickness ratio $RC_T/FBF_T$ of not greater than about 16, where RCT is the thickness of the release coating and $FBF_T$ is the thickness of the flexible barrier film or not greater than about 15 or not greater than about 14 or not greater than about 13 or not greater than about 12 or not greater than about 11 or not greater than about 10 or not greater than about 9 or not greater than about 8 or not greater than about 7 or not greater than about 6 or not greater than about 5 or not greater than about 4 or not greater than about 3 or not greater than about 2 or not greater than about 1.5 or not greater than about 1.1.

Embodiment 17. The multifunctional film of any one of embodiments 1, 2, and 3, wherein the multifunctional film comprises a release coating thickness ratio $RC_T/FBF_T$ of at least about 0.00001, where RCT is the thickness of the release coating and $FBF_T$ is the thickness of the flexible barrier film or at least about 0.00002 or at least about 0.00003 or at least about 0.00004 or at least about 0.00005 or at least about 0.00006 or at least about 0.00007 or at least about 0.00008 or at least about 0.00009 or at least about 0.0001 or at least about 0.00015 or at least about 0.0002.

Embodiment 18. The multifunctional film of any one of embodiments 1, 2, and 3, wherein the flexible barrier film has a thickness of at least about 0.2 mil or at least about 0.3 mil or at least about 0.4 mil or at least about 0.5 mil or at least about 0.6 mil or at least about 0.7 mil or at least about 0.8 mil or at least about 0.9 mil or at least about 1.0 mil.

Embodiment 19. The multifunctional film of any one of embodiments 1, 2, and 3, wherein the flexible barrier film has a thickness of not greater than about 30 mils or not greater than about 25 mils or not greater than about 20 mils or not greater than about 15 mils or not greater than about 14 mils or not greater than about 13 mils or not greater than about 12 mils or not greater than about 11 mils or not greater than about 10 mils or not greater than about 9 mils or not greater than about 8 mils.

Embodiment 20. The multifunctional film of any one of embodiments 1, 2, and 3, wherein the release coating has a thickness of at least about 0.01 microns or at least about 0.02 microns or at least about 0.03 microns or at least about 0.04 microns or at least about 0.05 microns or at least about 0.06 microns or at least about 0.07 microns or at least about 0.08 microns or at least about 0.09 microns or at least about 0.1 microns.

Embodiment 21. The multifunctional film of any one of embodiments 1, 2, and 3, wherein the release coating has a thickness of not greater than about 100 microns or not greater than about 90 microns or not greater than about 80 microns or not greater than about 70 microns or not greater than about 60 microns or not greater than about 50 microns or not greater than about 40 microns or not greater than about 30 microns or not greater than about 20 microns or not greater than about 10 microns or not greater than about 9 microns or not greater than about 8 microns or not greater than about 7 microns or not greater than about 6 microns or not greater than about 5 microns.

Embodiment 22. The multifunctional film of any one of embodiments 1, 2, and 3, wherein the textured surface of the flexible barrier film comprises a repeating pattern of channels.

Embodiment 23. The multifunctional film of embodiment 22, wherein the repeating pattern of channels is in the form of a cross-hatch pattern or a weave pattern.

Embodiment 24. The multifunctional film of embodiment 22, wherein the repeating pattern of channels have an isotropic orientation.

Embodiment 25. The multifunctional film of embodiment 22, wherein the repeating pattern of channels have an anisotropic orientation.

Embodiment 26. The multifunctional film of embodiment 22, wherein the channels have an average channel width $AC_W$ of at least about 0.1 mm or at least about 0.2 mm or at least about 0.3 mm or at least about 0.4 mm or at least about 0.5 mm or at least about 0.6 mm or at least about 0.7 mm or at least about 0.8 mm or at least about 0.9 mm or at least about 1.0 mm.

Embodiment 27. The multifunctional film of embodiment 22, wherein the channels have an average channel width $AC_W$ of not greater than about 100 mm or not greater than about 90 mm or not greater than about 80 mm or not greater than about 70 mm or not greater than about 60 mm or not greater than about 50 mm or not greater than about 40 mm or not greater than about 30 mm or not greater than about 25 mm or not greater than about 20 mm or not greater than about 15 mm.

Embodiment 28. The multifunctional film of embodiment 22, wherein the channels have an average channel depth $AC_D$ of at least about 1 micron or at least about 1.1 microns or at least about 1.2 microns or at least about 1.3 microns.

Embodiment 29. The multifunctional film of embodiment 22, wherein the channels have an average channel depth $AC_D$ of not greater than about 500 mils or not greater than about 450 mils or not greater than about 400 mils or not greater than about 350 mils or not greater than about 300 mils or not greater than about 250 mils or not greater than about 200 mils or not greater than about 200 mils or not greater than about 150 mils or not greater than about 100 mils or not greater than about 75 mils or not greater than about 50 mils or not greater than about 25 mils.

Embodiment 30. The multifunctional film of any one of embodiments 1, 2, and 3, wherein the release coating directly contacts the textured surface of the flexible barrier film.

Embodiment 31. The multifunctional film of any one of embodiments 1, 2, and 3, wherein the release coating is bonded to the textured surface of the flexible barrier film.

Embodiment 32. A vacuum bag comprising a multifunctional film comprising: a flexible barrier film comprising a textured surface oriented to face an internal cavity of the vacuum bag; and a release coating overlying the textured surface of the flexible barrier film; wherein the multifunctional film has an oxygen ($O_2$) permeability of not greater than about 1100 cc/($m^2$-day-atm) and wherein the multifunctional film has a stability rating of not greater than about 90%, where the stability rating is defined as the maximum percent decrease in elongation at break as measured using ASTM D882 after being exposed to a temperature of 200° C. for 12 hours.

Embodiment 33. A vacuum bag comprising a multifunctional film comprising: a flexible barrier film comprising a textured surface oriented to face an internal cavity of the vacuum bag; and a release coating overlying the textured surface of the flexible barrier film; wherein the flexible barrier film has an oxygen ($O_2$) permeability of not greater than about 1100 cc/($m^2$-day-atm) and wherein the multifunctional film has a stability rating of not greater than about 90%, where the stability rating is defined as the maximum percent decrease in elongation at break as measured using ASTM D882 after being exposed to a temperature of 200° C. for 12 hours.

Embodiment 34. A vacuum bag comprising a multifunctional film comprising: a flexible barrier film comprising a textured surface oriented to face an internal cavity of the vacuum bag; and a release coating overlying the textured surface of the flexible barrier film; wherein the flexible barrier film comprises a nylon resin grade material, a fluoropolymer material, a polyethylene material, a polypropylene material, a polyolefin material, or any combination thereof; and wherein the release coating comprises a silicone-based material, an acrylic-based material, a urethane-based material, a fluoropolymer-based material, a urethane-acrylate based material, or a combination thereof.

Embodiment 35. The vacuum bag of any one of embodiments 33 and 34, wherein the multifunctional film has an oxygen ($O_2$) permeability of not greater than about 1100 cc/($m^2$-day-atm) or not greater than about 1000 cc/($m^2$-day-atm) or not greater than about 900 cc/($m^2$-day-atm) or not greater than about 800 cc/($m^2$-day-atm) or not greater than about 700 cc/($m^2$-day-atm) or not greater than about 600 cc/($m^2$-day-atm) or not greater than about 500 cc/($m^2$-day-atm) or not greater than about 400 cc/($m^2$-day-atm) or not greater than about 300 cc/($m^2$-day-atm) or not greater than about 200 cc/($m^2$-day-atm) or not greater than about 100 cc/($m^2$-day-atm).

Embodiment 36. The vacuum bag of any one of embodiments 32 and 34, wherein the flexible barrier film has an oxygen ($O_2$) permeability of not greater than about 1100 cc/($m^2$-day-atm) or not greater than about 1000 cc/($m^2$-day-atm) or not greater than about 900 cc/($m^2$-day-atm) or not greater than about 800 cc/($m^2$-day-atm) or not greater than about 700 cc/($m^2$-day-atm) or not greater than about 600 cc/($m^2$-day-atm) or not greater than about 500 cc/($m^2$-day-atm) or not greater than about 400 cc/($m^2$-day-atm) or not greater than about 300 cc/($m^2$-day-atm) or not greater than about 200 cc/($m^2$-day-atm) or not greater than about 100 cc/($m^2$-day-atm).

Embodiment 37. The vacuum bag of embodiment 34, wherein the multifunctional film has a stability rating of not greater than about 90%, where the stability rating is defined as the maximum percent decrease in elongation at break as measured using ASTM D882 after being exposed to a temperature of 200° C. for 12 hours.

Embodiment 38. The vacuum bag of any one of embodiments 32, 33, and 34, wherein the release coating has a release force of not greater than about 100 g/inch or not greater than about 95 g/inch or not greater than about 90 g/inch or not greater than about 85 g/inch or not greater than about 80 g/inch or not greater than about 75 g/inch or not greater than about 70 g/inch or not greater than about 65 g/inch or not greater than about 60 g/inch or not greater than about 55 g/inch or not greater than about 50 g/inch or not greater than about 45 g/inch or not greater than about 40 g/inch.

Embodiment 39. The vacuum bag of any one of embodiments 32, 33, and 34, wherein the multifunctional film comprises a Young's modulus of at least about 10 MPa.

Embodiment 40. The vacuum bag of any one of embodiments 32, 33, and 34, wherein the multifunctional film comprises a Young's modulus of at least about 10 MPa or at least about 50 MPa or at least about 100 MPa or at least about 150 MPa or at least about 200 MPa or at least about 250 MPa or at least about 300 MPa or at least about 350 MPa or at least about 400 MPa or at least about 450 MPa or at least about 500 MPA.

Embodiment 41. The vacuum bag of any one of embodiments 32, 33, and 34, wherein the multifunctional film comprises a Young's modulus of not greater than about 10,000 MPa or not greater than about 9,000 MPa or not greater than about 8,000 MPa or not greater than about 7,000 MPa or not greater than about 6,000 MPa or not greater than about 5,000 MPa or not greater than about 4,000 MPa or not greater than about 3,000 MPa or not greater than about 2,000 MPa.

Embodiment 42. The vacuum bag of any one of embodiments 32, 33, and 34, wherein the multifunctional film comprises an elongation before break of at least about 1% or at least about 2% or at least about 3% or at least about 4% or at least about 5% or at least about 6% or at least about 7% or at least about 8% or at least about 9% or at least about 10%.

Embodiment 43. The vacuum bag of any one of embodiments 32, 33, and 34, wherein the multifunctional film comprises an elongation before break of not greater than about 2000% or not greater than about 1500% or not greater than about 1000% or not greater than about 500% or not greater than about 100% or not greater than about 90% or not greater than about 80% or not greater than about 70% or not greater than about 60% or not greater than about 50% or not greater than about 40% or not greater than about 30%.

Embodiment 44. The vacuum bag of any one of embodiments 32 and 33, wherein the flexible barrier film comprises a nylon resin grade material, a fluoropolymer material, a polyethylene material, a polypropylene material, a polyolefin material, or any combination thereof.

Embodiment 45. The vacuum bag of any one of embodiments 34 and 44, wherein the nylon resin grade material comprises Nylon 6, Nylon 6,6, Nylon 6,4, Nylon 6, 66, Nylon MXD6, PAMACM12, PA6I, PA6I/6T or any combination thereof.

Embodiment 46. The vacuum bag of any one of embodiments 32 and 33, wherein the release coating comprises a silicon-based material, a fluoropolymer-based material, acrylic-based material, a urethane-based material, a urethane-acrylate based material, or a combination thereof.

Embodiment 47. The vacuum bag of any one of embodiments 34 and 46, wherein the release coating comprises polyfunctional acrylic-based UV-curable coating or a polyfunctional acrylic-based thermal-curable coating.

Embodiment 48. The vacuum bag of any one of embodiments 32, 33, and 34, wherein the multifunctional film comprises a release coating thickness ratio $RC_T/FBF_T$ of not greater than about 16, where RCT is the thickness of the release coating and $FBF_T$ is the thickness of the flexible barrier film or not greater than about 15 or not greater than about 14 or not greater than about 13 or not greater than about 12 or not greater than about 11 or not greater than about 10 or not greater than about 9 or not greater than about 8 or not greater than about 7 or not greater than about 6 or not greater than about 5 or not greater than about 4 or not greater than about 3 or not greater than about 2 or not greater than about 1.5 or not greater than about 1.1.

Embodiment 49. The vacuum bag of any one of embodiments 32, 33, and 34, wherein the multifunctional film comprises a release coating thickness ratio $RC_T/FBF_T$ of at least about 0.00001, where RCT is the thickness of the release coating and $FBF_T$ is the thickness of the flexible barrier film or at least about 0.00002 or at least about 0.00003 or at least about 0.00004 or at least about 0.00005 or at least about 0.00006 or at least about 0.00007 or at least about 0.00008 or at least about 0.00009 or at least about 0.0001 or at least about 0.00015 or at least about 0.0002.

Embodiment 50. The vacuum bag of any one of embodiments 32, 33, and 34, wherein the flexible barrier film has a thickness of at least about 0.2 mil or at least about 0.3 mil or at least about 0.4 mil or at least about 0.5 mil or at least about 0.6 mil or at least about 0.7 mil or at least about 0.8 mil or at least about 0.9 mil or at least about 1.0 mil.

Embodiment 51. The vacuum bag of any one of embodiments 32, 33, and 34, wherein the flexible barrier film has a thickness of not greater than about 30 mils or not greater than about 25 mils or not greater than about 20 mils or not greater than about 15 mils or not greater than about 14 mils or not greater than about 13 mils or not greater than about 12 mils or not greater than about 11 mils or not greater than about 10 mils or not greater than about 9 mils or not greater than about 8 mils.

Embodiment 52. The vacuum bag of any one of embodiments 32, 33, and 34, wherein the release coating has a thickness of at least about 0.01 microns or at least about 0.02 microns or at least about 0.03 microns or at least about 0.04 microns or at least about 0.05 microns or at least about 0.06 microns or at least about 0.07 microns or at least about 0.08 microns or at least about 0.09 microns or at least about 0.1 microns.

Embodiment 53. The vacuum bag of any one of embodiments 32, 33, and 34, wherein the release coating has a thickness of not greater than about 100 microns or not greater than about 90 microns or not greater than about 80 microns or not greater than about 70 microns or not greater than about 60 microns or not greater than about 50 microns or not greater than about 40 microns or not greater than about 30 microns or not greater than about 20 microns or not greater than about 10 microns or not greater than about 9 microns or not greater than about 8 microns or not greater than about 7 microns or not greater than about 6 microns or not greater than about 5 microns.

Embodiment 54. The vacuum bag of any one of embodiments 32, 33, and 34, wherein the textured surface of the flexible barrier film comprises a repeating pattern of channels.

Embodiment 55. The vacuum bag of embodiment 54, wherein the repeating pattern of channels is in the form of a cross-hatch pattern or a weave pattern.

Embodiment 56. The vacuum bag of embodiment 54, wherein the repeating pattern of channels have an isotropic orientation.

Embodiment 57. The vacuum bag of embodiment 54, wherein the repeating pattern of channels have an anisotropic orientation.

Embodiment 58. The vacuum bag of embodiment 54, wherein the channels have an average channel width $AC_W$ of at least about 0.1 mm or at least about 0.2 mm or at least about 0.3 mm or at least about 0.4 mm or at least about 0.5 mm or at least about 0.6 mm or at least about 0.7 mm or at least about 0.8 mm or at least about 0.9 mm or at least about 1.0 mm or at least about 1 mm. (for our design); 0.1 mm (for all encompassing design).

Embodiment 59. The vacuum bag of embodiment 54, wherein the channels have an average channel width $AC_W$ of not greater than about 100 mm or not greater than about 90 mm or not greater than about 80 mm or not greater than about 70 mm or not greater than about 60 mm or not greater than about 50 mm or not greater than about 40 mm or not greater than about 30 mm or not greater than about 25 mm or not greater than about 20 mm or not greater than about 15 mm.

Embodiment 60. The vacuum bag of embodiment 54, wherein the channels have an average channel depth $AC_D$ of at least about 1 micron or at least about 1.1 microns or at least about 1.2 microns or at least about 1.3 microns.

Embodiment 61. The vacuum bag of embodiment 54, wherein the channels have an average channel depth $AC_D$ of not greater than about 500 mils or not greater than about 450 mils or not greater than about 400 mils or not greater than about 350 mils or not greater than about 300 mils or not greater than about 250 mils or not greater than about 200 mils or not greater than about 200 mils or not greater than about 150 mils or not greater than about 100 mils or not greater than about 75 mils or not greater than about 50 mils or not greater than about 25 mils.

Embodiment 62. The vacuum bag of any one of embodiments 32, 33, and 34, wherein the release coating directly contacts the textured surface of the flexible barrier film.

Embodiment 63. The vacuum bag of any one of embodiments 32, 33, and 34, wherein the release coating is bonded to the textured surface of the flexible barrier film.

Embodiment 64. A method of forming a multifunctional film for a vacuum bag, the method comprising: providing a flexible barrier film; embossing a textured surface onto a first side of the flexible barrier film; and coating the textured surface of the flexible barrier film with a release coating, wherein the multifunctional film has an oxygen ($O_2$) permeability of not greater than about 1100 cc/($m^2$-day-atm) and wherein the multifunctional film has a stability rating of not greater than about 90%, where the stability rating is defined as the maximum percent decrease in elongation at break as measured using ASTM D882 after being exposed to a temperature of 200° C. for 12 hours.

Embodiment 65. A method of forming a multifunctional film for a vacuum bag, the method comprising: providing a flexible barrier film; creating a textured surface on a first side of the flexible barrier film; and coating the textured surface of the flexible barrier film with a release coating, wherein the flexible barrier film has an oxygen ($O_2$) permeability of not greater than about 1100 cc/($m^2$-day-atm) and wherein the multifunctional film has a stability rating of not greater than about 90%, where the stability rating is defined as the maximum percent decrease in elongation at break as measured using ASTM D882 after being exposed to a temperature of 200° C. for 12 hours.

Embodiment 66. A method of forming a multifunctional film for a vacuum bag, the method comprising: providing a flexible barrier film; creating a textured surface on a first side of the flexible barrier film; and coating the textured surface of the flexible barrier film with a release coating, wherein the flexible barrier film comprises a nylon resin grade material, a fluoropolymer material, a polyethylene material, a polypropylene material, a polyolefin material, or any combination thereof; and wherein the release coating comprises a silicone-based material, an acrylic-based material, a urethane-based material, a fluoropolymer-based material, a urethane-acrylate based material, or a combination thereof.

Embodiment 67. The method of any one of embodiments 64, 65, and 66, wherein creating the textured surface on the first side of the flexible barrier film comprises embossing the textured surface on the first side of the flexible barrier film.

Embodiment 68. The method of any one of embodiments 64, 65, and 66, wherein creating the textured surface on the first side of the flexible barrier film comprises thermally embossing the textured surface on the first side of the flexible barrier film.

Embodiment 69. The method of any one of embodiments 64, 65, and 66, wherein coating the textured surface of the flexible barrier film with a release coating comprises gravure coating (reverse or forward), slot die coating, roll coating (reverse or forward), spray coating, mayer rod coating, or flood coating.

Embodiment 70. The method of any one of embodiments 64, 65, and 66, wherein the method further comprises curing the coating on the textured surface of the flexible barrier film.

Embodiment 71. The method of embodiment 70, wherein curing the coating on the textured surface of the flexible barrier film is performed at a curing temperature of not greater than about 200° C. or not greater than about 190° C. or not greater than about 180° C.

Embodiment 72. The method of embodiment 70, wherein curing the coating on the textured surface of the flexible barrier film is performed for a curing time of not greater than about 24 hours or not greater than about 23 hours or not greater than about 22 hours or not greater than about 21 hours or not greater than about 20 hours or not greater than about 19 hours or not greater than about 18 hours or not greater than about 17 hours or not greater than about 16 hours or not greater than about 15 hours or not greater than about 14 hours or not greater than about 13 hours or not greater than about 12 hours.

Embodiment 73. The method of any one of embodiments 65 and 66, wherein the multifunctional film has an oxygen ($O_2$) permeability of not greater than about 1100 cc/($m^2$-day-atm) or not greater than about 1000 cc/($m^2$-day-atm) or not greater than about 900 cc/($m^2$-day-atm) or not greater than about 800 cc/($m^2$-day-atm) or not greater than about 700 cc/($m^2$-day-atm) or not greater than about 600 cc/($m^2$-day-atm) or not greater than about 500 cc/($m^2$-day-atm) or not greater than about 400 cc/($m^2$-day-atm) or not greater than about 300 cc/($m^2$-day-atm) or not greater than about 200 cc/($m^2$-day-atm) or not greater than about 100 cc/($m^2$-day-atm).

Embodiment 74. The method of any one of embodiments 64 and 66, wherein the flexible barrier film has an oxygen ($O_2$) permeability of not greater than about 1100 cc/($m^2$-day-atm) or not greater than about 1000 cc/($m^2$-day-atm) or not greater than about 900 cc/($m^2$-day-atm) or not greater than about 800 cc/($m^2$-day-atm) or not greater than about 700 cc/($m^2$-day-atm) or not greater than about 600 cc/($m^2$-day-atm) or not greater than about 500 cc/($m^2$-day-atm) or not greater than about 400 cc/($m^2$-day-atm) or not greater than about 300 cc/($m^2$-day-atm) or not greater than about 200 cc/($m^2$-day-atm) or not greater than about 100 cc/($m^2$-day-atm).

Embodiment 75. The method of embodiment 66, wherein the multifunctional film has a stability rating of not greater than about 90%, where the stability rating is defined as the maximum percent decrease in elongation at break as measured using ASTM D882 after being exposed to a temperature of 200° C. for 12 hours.

Embodiment 76. The method of any one of embodiments 64, 65, and 66, wherein the release coating has a release force of not greater than about 100 g/inch or not greater than about 95 g/inch or not greater than about 90 g/inch or not greater than about 85 g/inch or not greater than about 80 g/inch or not greater than about 75 g/inch or not greater than about 70 g/inch or not greater than about 65 g/inch or not greater than about 60 g/inch or not greater than about 55 g/inch or not greater than about 50 g/inch or not greater than about 45 g/inch or not greater than about 40 g/inch.

Embodiment 77. The method of any one of embodiments 64, 65, and 66, wherein the multifunctional film comprises a Young's modulus of at least about 10 MPa or at least about 50 MPa or at least about 100 MPa or at least about 150 MPa or at least about 200 MPa or at least about 250 MPa or at least about 300 MPa or at least about 350 MPa or at least about 400 MPa or at least about 450 MPa or at least about 500 MPA.

Embodiment 78. The method of any one of embodiments 64, 65, and 66, wherein the multifunctional film comprises a Young's modulus of not greater than about 10,000 MPa or not greater than about 9,000 MPa or not greater than about 8,000 MPa or not greater than about 7,000 MPa or not greater than about 6,000 MPa or not greater than about 5,000 MPa or not greater than about 4,000 MPa or not greater than about 3,000 MPa or not greater than about 2,000 MPa.

Embodiment 79. The method of any one of embodiments 64, 65, and 66, wherein the multifunctional film comprises an elongation before break of at least about 1% or at least about 2% or at least about 3% or at least about 4% or at least about 5% or at least about 6% or at least about 7% or at least about 8% or at least about 9% or at least about 10%.

Embodiment 80. The method of any one of embodiments 64, 65, and 66, wherein the multifunctional film comprises an elongation before break of not greater than about 2000% or not greater than about 1500% or not greater than about 1000% or not greater than about 500% or not greater than about 100% or not greater than about 90% or not greater than about 80% or not greater than about 70% or not greater than about 60% or not greater than about 50% or not greater than about 40% or not greater than about 30%.

Embodiment 81. The method of any one of embodiments 64 and 65, wherein the flexible barrier film comprises a nylon resin grade material, a fluoropolymer material, a polyethylene material, a polypropylene material, a polyolefin material, or any combination thereof.

Embodiment 82. The method of any one of embodiments 66 and 81, wherein the nylon resin grade material comprises Nylon 6, Nylon 6,6, Nylon 6,4, Nylon 6, 66, Nylon MXD6, PAMACM12, PA6I, PA6I/6T or any combination thereof.

Embodiment 83. The method of any one of embodiments 64 and 65, wherein the release coating comprises a silicon-based material, a fluoropolymer-based material, acrylic-based material, a urethane-based material, a urethane-acrylate based material, or a combination thereof.

Embodiment 84. The method of any one of embodiments 66 and 83, wherein the release coating comprises polyfunctional acrylic-based UV-curable coating or a polyfunctional acrylic-based thermal-curable coating.

Embodiment 85. The method of any one of embodiments 64, 65, and 66, wherein the multifunctional film comprises a release coating thickness ratio $RC_T/FBF_T$ of not greater than about 16, where RCT is the thickness of the release coating and $FBF_T$ is the thickness of the flexible barrier film or not greater than about 15 or not greater than about 14 or not greater than about 13 or not greater than about 12 or not greater than about 11 or not greater than about 10 or not greater than about 9 or not greater than about 8 or not greater than about 7 or not greater than about 6 or not greater than about 5 or not greater than about 4 or not greater than about 3 or not greater than about 2 or not greater than about 1.5 or not greater than about 1.1.

Embodiment 86. The method of any one of embodiments 64, 65, and 66, wherein the multifunctional film comprises a release coating thickness ratio $RC_T/FBF_T$ of at least about 0.00001, where RCT is the thickness of the release coating and $FBF_T$ is the thickness of the flexible barrier film or at least about 0.00002 or at least about 0.00003 or at least about 0.00004 or at least about 0.00005 or at least about 0.00006 or at least about 0.00007 or at least about 0.00008 or at least about 0.00009 or at least about 0.0001 or at least about 0.00015 or at least about 0.0002.

Embodiment 87. The method of any one of embodiments 64, 65, and 66, wherein the flexible barrier film has a thickness of at least about 0.2 mil or at least about 0.3 mil or at least about 0.4 mil or at least about 0.5 mil or at least about 0.6 mil or at least about 0.7 mil or at least about 0.8 mil or at least about 0.9 mil or at least about 1.0 mil.

Embodiment 88. The method of any one of embodiments 64, 65, and 66, wherein the flexible barrier film has a thickness of not greater than about 30 mils or not greater than about 25 mils or not greater than about 20 mils or not greater than about 15 mils or not greater than about 14 mils or not greater than about 13 mils or not greater than about 12 mils or not greater than about 11 mils or not greater than about 10 mils or not greater than about 9 mils or not greater than about 8 mils.

Embodiment 89. The method of any one of embodiments 64, 65, and 66, wherein the release coating has a thickness of at least about 0.01 microns or at least about 0.02 microns or at least about 0.03 microns or at least about 0.04 microns or at least about 0.05 microns or at least about 0.06 microns or at least about 0.07 microns or at least about 0.08 microns or at least about 0.09 microns or at least about 0.1 microns.

Embodiment 90. The method of any one of embodiments 64, 65, and 66, wherein the release coating has a thickness of not greater than about 100 microns or not greater than about 90 microns or not greater than about 80 microns or not greater than about 70 microns or not greater than about 60 microns or not greater than about 50 microns or not greater than about 40 microns or not greater than about 30 microns or not greater than about 20 microns or not greater than about 10 microns or not greater than about 9 microns or not greater than about 8 microns or not greater than about 7 microns or not greater than about 6 microns or not greater than about 5 microns.

Embodiment 91. The method of any one of embodiments 64, 65, and 66, wherein the textured surface of the flexible barrier film comprises a repeating pattern of channels.

Embodiment 92. The method of embodiment 91, wherein the repeating pattern of channels is in the form of a crosshatch pattern or a weave pattern.

Embodiment 93. The method of embodiment 91, wherein the repeating pattern of channels have an isotropic orientation.

Embodiment 94. The method of embodiment 91, wherein the repeating pattern of channels have an anisotropic orientation.

Embodiment 95. The method of embodiment 91, wherein the channels have an average channel width $AC_W$ of at least about 0.1 mm or at least about 0.2 mm or at least about 0.3 mm or at least about 0.4 mm or at least about 0.5 mm or at least about 0.6 mm or at least about 0.7 mm or at least about 0.8 mm or at least about 0.9 mm or at least about 1.0 mm or at least about 1 mm. (for our design); 0.1 mm (for all encompassing design).

Embodiment 96. The method of embodiment 91, wherein the channels have an average channel width $AC_W$ of not greater than about 100 mm or not greater than about 90 mm or not greater than about 80 mm or not greater than about 70 mm or not greater than about 60 mm or not greater than about 50 mm or not greater than about 40 mm or not greater than about 30 mm or not greater than about 25 mm or not greater than about 20 mm or not greater than about 15 mm.

Embodiment 97. The method of embodiment 91, wherein the channels have an average channel depth $AC_D$ of at least about 1 micron or at least about 1.1 microns or at least about 1.2 microns or at least about 1.3 microns.

Embodiment 98. The method of embodiment 91, wherein the channels have an average channel depth $AC_D$ of not greater than about 500 mils or not greater than about 450 mils or not greater than about 400 mils or not greater than about 350 mils or not greater than about 300 mils or not greater than about 250 mils or not greater than about 200 mils or not greater than about 200 mils or not greater than about 150 mils or not greater than about 100 mils or not greater than about 75 mils or not greater than about 50 mils or not greater than about 25 mils.

Embodiment 99. The method of any one of embodiments 64, 65, and 66, wherein the release coating directly contacts the textured surface of the flexible barrier film.

Embodiment 100. The method of any one of embodiments 64, 65, and 66, wherein the release coating is bonded to the textured surface of the flexible barrier film.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A multifunctional film for a vacuum bag, wherein the multifunctional film comprises:
    a flexible barrier film comprising a textured surface; and
    a release coating overlying the textured surface of the flexible barrier film;
        wherein the multifunctional film has an oxygen ($O_2$) permeability of not greater than about 1100 cc/($m^2$-day-atm),
        wherein the multifunctional film comprises a Young's modulus of at least about 10 MPa and not greater than about 10,000 MPa,
        wherein the textured surface of the flexible barrier film comprises a repeating pattern of channels,
        wherein the channels have an average channel width $AC_W$ of at least about 0.1 mm and not greater than about 100 mm, and
        wherein the multifunctional film has a stability rating of not greater than about 90%, where the stability rating is defined as the maximum percent decrease in elongation at break as measured using ASTM D882 after being exposed to a temperature of 200° C. for 12 hours.

2. The multifunctional film of claim 1, wherein the flexible barrier film has an oxygen ($O_2$) permeability of not greater than about 1100 cc/($m^2$-day-atm).

3. The multifunctional film of claim 1, wherein the multifunctional film comprises a Young's modulus of at least about 500 MPa and not greater than about 2,000 MPa.

4. The multifunctional film of claim 1, wherein the multifunctional film comprises an elongation before break of at least about 1% and not greater than about 2000%.

5. The multifunctional film of claim 1, wherein the flexible barrier film comprises a nylon resin grade material, a fluoropolymer material, a polyethylene material, a polypropylene material, a polyolefin material, or any combination thereof.

6. The multifunctional film of claim 1, wherein the multifunctional film comprises a release coating thickness ratio $RC_T/FBF_T$ of not greater than about 16, where RCT is the thickness of the release coating and $FBF_T$ is the thickness of the flexible barrier film.

7. The multifunctional film of claim 1, wherein the channels have an average channel width $AC_W$ of at least about 1.0 mm and not greater than about 90 mm.

8. The multifunctional film of claim 1, wherein the channels have an average channel depth $AC_D$ of at least about 1 micron and not greater than about 500 mils.

9. The multifunctional film of claim 1, wherein the release coating directly contacts the textured surface of the flexible barrier film.

10. The multifunctional film of claim 1, wherein the release coating comprises a silicon-based material, a fluoropolymer-based material, acrylic-based material, a urethane-based material, a urethane-acrylate based material, or a combination thereof.

11. The multifunctional film of claim 10, wherein the release coating comprises polyfunctional acrylic-based UV-curable coating or a polyfunctional acrylic-based thermal-curable coating.

12. A multifunctional film for a vacuum bag, wherein the multifunctional film comprises:
 a flexible barrier film comprising a textured surface; and
 a release coating overlying the textured surface the flexible barrier film,
  wherein the multifunctional film comprises a Young's modulus of at least about 10 MPa and not greater than about 10.000 MPa,
  wherein the textured surface of the flexible barrier film comprises a repeating pattern of channels,
  wherein the channels have an average channel width $AC_W$ of at least about 0.1 mm and not greater than about 100 mm,
  wherein the flexible barrier film comprises a nylon resin grade material, a fluoropolymer material, a polyethylene material, a polypropylene material, a polyolefin material, or any combination thereof; and
  wherein the release coating comprises a silicone-based material, an acrylic-based material, a urethane-based material, a fluoropolymer-based material, a urethane-acrylate based material, or a combination thereof.

13. The multifunctional film of claim 12, wherein the flexible barrier film has an oxygen ($O_2$) permeability of not greater than about 1100 cc/($m^2$-day-atm).

14. The multifunctional film of claim 12, wherein the multifunctional film comprises a Young's modulus of at least about 500 MPa and not greater than about 2,000 MPa.

15. The multifunctional film of claim 12, wherein the multifunctional film comprises an elongation before break of at least about 1% and not greater than about 2000%.

16. The multifunctional film of claim 12, wherein the flexible barrier film comprises a nylon resin grade material, a fluoropolymer material, a polyethylene material, a polypropylene material, a polyolefin material, or any combination thereof.

17. A vacuum bag comprising a multifunctional film comprising:
 a flexible barrier film comprising a textured surface oriented to face an internal cavity of the vacuum bag; and
 a release coating overlying the textured surface of the flexible barrier film;
  wherein the multifunctional film comprises a Young's modulus of at least about 10 MPa and not greater than about 10,000 MPa,
  wherein the textured surface of the flexible barrier film comprises a repeating pattern of channels,
  wherein the channels have an average channel width $AC_W$ of at least about 0.1 mm and not greater than about 100 mm,
  wherein the multifunctional film has an oxygen ($O_2$) permeability of not greater than about 1100 cc/($m^2$-day-atm) and
  wherein the multifunctional film has a stability rating of not greater than about 90%, where the stability rating is defined as the maximum percent decrease in elongation at break as measured using ASTM D882 after being exposed to a temperature of 200° C. for 12 hours.

* * * * *

UNITED STATES PATENT AND TRADEMARK OFFICE
CERTIFICATE OF CORRECTION

| | | |
|---|---|---|
| PATENT NO. | : 12,226,967 B2 | Page 1 of 1 |
| APPLICATION NO. | : 17/348055 | |
| DATED | : February 18, 2025 | |
| INVENTOR(S) | : Steven R. Dubrule et al. | |

It is certified that error appears in the above-identified patent and that said Letters Patent is hereby corrected as shown below:

In the Specification

Column 27 Line 20, please delete "10.000", and insert --10,000--

Signed and Sealed this
Thirteenth Day of January, 2026

John A. Squires
*Director of the United States Patent and Trademark Office*